United States Patent [19]

Oliver, Jr. et al.

[11] 4,456,537

[45] Jun. 26, 1984

[54] CHEMICALLY CLEANING DRILLING/COMPLETION/PACKER BRINES

[76] Inventors: John E. Oliver, Jr., 3752 Del Monte, Houston, Tex. 77019; Arnold M. Singer, 1516 Sul Ross, Apt. #3, Houston, Tex. 77006

[21] Appl. No.: 310,653

[22] Filed: Oct. 13, 1981

[51] Int. Cl.³ .................. E21B 43/00; C09K 7/02
[52] U.S. Cl. .................. 252/8.55 R; 210/727; 210/728; 252/8.5 B
[58] Field of Search .......... 252/8.5 R, 8.5 A, 8.5 B, 252/8.5 C, 8.55 R; 210/725, 727, 728, 729

[56] References Cited

U.S. PATENT DOCUMENTS

| | | | |
|---|---|---|---|
| Re. 23,614 | 1/1953 | Denman | 210/749 |
| 2,315,734 | 4/1943 | Ralston et al. | 252/326 |
| 2,414,668 | 1/1947 | Ratcliffe et al. | 252/8.55 |
| 2,873,253 | 2/1959 | Stanphill | 252/8.55 |
| 3,025,236 | 3/1962 | Barrett et al. | 252/8.5 |
| 3,086,938 | 4/1963 | Means et al. | 252/8.55 |
| 3,126,950 | 3/1964 | Carlberg et al. | 252/8.55 X |
| 3,524,908 | 8/1970 | Redmore et al. | 210/749 |
| 3,617,568 | 11/1971 | Ries | 210/727 |
| 3,737,037 | 6/1973 | Bone . | |
| 3,787,319 | 1/1974 | Larsen | 252/8.5 |
| 3,798,270 | 3/1974 | Lee et al. | 260/566 |
| 3,882,029 | 5/1975 | Fischer et al. | 252/8.5 |
| 4,025,443 | 5/1977 | Jackson | 252/8.5 |
| 4,032,460 | 6/1977 | Zilch et al. | 252/8.55 |
| 4,140,639 | 2/1979 | Jackson | 252/8.5 |
| 4,172,801 | 10/1979 | Jackson | 252/8.5 |
| 4,233,162 | 11/1980 | Carney | 252/8.5 |
| 4,255,258 | 3/1981 | Carr et al. | 210/727 |
| 4,292,183 | 9/1981 | Sanders | 252/8.55 |
| 4,304,677 | 12/1981 | Stauffer et al. | 252/8.55 |

*Primary Examiner*—Herbert B. Guynn
*Attorney, Agent, or Firm*—Vaden, Eickenroht, Thompson, Bednar & Jamison

[57] ABSTRACT

A process for removing contaminating solids from high density, salt type aqueous drilling/completion/packer fluid prior to its introduction into a well bore. A small effective amount (e.g., 0.5% volume) of an aliphatic alcohol (e.g., n-hexanol) and a surface active chemical aid (e.g., bis hydroxy ethyl cetyl amine) are thoroughly intermixed into the fluid. After the solids agglomerate, the solids are separated from the fluid before introduction in a solids-free condition into the well bore. The fluid may have a density as high as 17 pounds per gallon and be a brine formed of the sodium, calcium or zinc salts with chloride or bromide anions.

11 Claims, No Drawings

CHEMICALLY CLEANING DRILLING/COMPLETION/PACKER BRINES

BACKGROUND OF THE INVENTION

1. Field of the Invention

This invention relates to the use of high density salt type aqueous fluids in wellbores, and it relates more particularly, to the introduction into the wellbore of these fluids in a solids-free condition.

2. Description of the Prior Art

Over the years, special aqueous brine solutions have been used in wellbores employed in the production of petroleum. These solutions have been used as both drilling, completion and packer fluids especially in deep wells subject to high formation gas pressures at elevated temperatures. The use of high density brines as well fluids in drilling, completion and packer functions is a well accepted practice in the oil field. These brines can be formed of the sodium, calcium and zinc salts with chloride and bromide. These aqueous fluids may include corrosion inhibitors and other salts such as soda ash. The density of these salt type well fluids depends in the particular salt, or mixture of salts, and their concentration in the aqueous well fluid. Usually, these salt type well fluids have a density in the range of between about 8 and 17 pounds per gallon.

The salt type well fluid should be solids-free in its use as a well fluid. If there are solids in a drilling or completion fluid, they can cause serious injury to a producing formation by plugging of the pore spaces therein or even of the perforations and channels provided to induce fluid flows between the formation and well bore. If there are solids in a packer fluid, the solids will precipitate with time upon the packer. As a result, these solids deposits make it difficult to disconnect the tubing from the packer with a resultant costly well workover.

The high density salt type well fluids could be prepared at the wellsite by dissolving the prescribed amount of salt into the aqueous phase, which phase is principally water but can include various inhibitors for preventing pitting, corrosion, etc. The mixture is circulated or agitated until there were no undissolved solids. Naturally, the problems of adding salts to be dissolved in the aqueous well fluid became progressively more severe as the density increases, both in time, manpower and equipment requirements.

At present, several vendors will deliver to the wellsite the prepared high density salt type aqueous well fluids of a desired density and combination of selected ingredients. It is desired that these well fluids are clean and free of solids. However, the delivery of these well fluids usually requires several changes in containers. For example the well fluid is moved from the vendor tanks to truck transport, offshore supply boat and rig storage tanks. In most circumstances, the well fluid becomes contaminated by undesired solids, including residual water wetted solids and/or oil based drilling mud, weighting agents such as barite, rust, salt, silt and sand, and other undissolved materials. Contaminating liquids such as mud bases, lubricants and diesel fuel can also be present in the well fluid. Usually, these contaminating liquids are occluded or absorbed on the undissolved solids.

If the amount of solids in the well fluid were small in amount, the rig equipment may be used for their removal usually in a stepwise flow pattern through cartridge filters. However, the costs of manpower and rig time in filtering the well fluid is usually prohibitive (e.g., $100,000 per each work shift) unless the solids are (1) less than 0.01% by weight of the well fluid, (2) granular, and (3) not gelatinous as is usually the case with bentonite mud contamination.

Contamination of well fluid by drilling mud components is most common since the well fluid is usually handled at the rigs in parts of the mud system. The mud system usually suffers contamination during washing of the cased well bore to remove residual mud and cement solids immediately prior to the introduction of the high density salt-type completion/packer well fluids. Only a small amount of the wash liquid needs to be combined with the well fluid so that its solids content becomes excessive. Then, the well fluid must be treated to remove these solids. Any residual solids must be less than 5 microns in maximum dimension otherwise they cause formation plugging.

As mentioned, the use of cartridge filters is impractical on other than very low solid contents in the well fluid. Further, rig time in equipment and manpower is restricted and available only for critical operations, namely optimum drilling of the well bore. As a result, well fluid with large solids contamination must be either discarded or returned to some facility for purification. Since the well fluid is very expensive (e.g., $300-$900 per barrel) it cannot be discarded. Furthermore, the well fluid must be carefully handled so as not to be spilled or wasted because environment injury occurs from strong aqueous brines.

The present invention is a process for removing solids substantially completely from salt type aqueous well fluids using a minimum of chemicals and simple procedural steps; and, the solids removal is accomplished in only one or two hours using rig equipment and manpower.

SUMMARY OF THE INVENTION

In accordance with this invention, there is provided a process to produce solids-free aqueous well fluid of the high density salt type. Small effective amounts of an aliphatic alcohol with between 5 and 8 carbon atoms and a surface active chemical aid are introduced into the fluid. Then, the agglomerated solids are separated from the well fluid before its introduction into the wellbore in a solids free state. The surface active chemical aid includes a surfactant having a molecular weight in the range of about 150 to about 500 with predominant hydrophobic characteristics. The surfactant is selected from the group comprising aliphatic amines, amides and aliphatic amine oxides wherein the amine and amide and amine oxides have an alkyl group with between 8 and 18 carbon atoms.

In the preferred embodiment, the alcohol is n-hexanol and the surface active chemical aid is bis hydroxy ethyl cetyl amine, and each material is used in the amount of 0.5% by volume of the well fluid.

DESCRIPTION OF PREFERRED EMBODIMENT

The present process can be practiced in the equipment usually found on drilling rigs, especially the large variety used in offshore production of petroleum. The equipment needs are relatively simple, and include (1) a mixing vessel of adequate size (e.g., 500 barrel), (2) a mixing unit either an impellar type or a centrifugal recirculating loop, and (3) a mechanism (e.g., skimmer or decanter) to separate the agglomerated solids from the clear well fluid. In addition, the now clear well fluid is usually passed through a cartridge filter system as insurance of introducing only solids-free salt type aqueous well fluid into the wellbore. It will be apparent that the best practice of this process is at the wellbore with the solids-free well fluid after cleaning being immediately introduced into the wellbore.

The solids contaminated well fluid is placed into a suitable container which can be exposed to air or sealed as is desired. A mixer is provided the container so that the materials used in the present process can be thoroughly mixed with the well fluid. In addition, the container is provided with a suitable mechanism to remove the agglomerated solids from the liquid phase. For example, the mechanism can be a rotary sweeper to remove the solids over an inclined discharge ramp such as used in air flotation cells. Alternatively, the container can be provided with adjustable liquid draw off pipes so that the solids-free well fluid can be decanted away from the removed solids. If desired, the container can be provided with both the sweeper or decanter mechanism for separating the solids and the liquid phases. Usually, the container can be operated at the ambient temparatures at which the well fluid is secured.

The well fluid is assumed to be heavily loaded with solids which may be sand, formation particles and debris, oil, pipe dope, rust, insoluble carbonates, mud solids such as barite, emulsifier, thinners, cement and other solid materials in various combinations and amounts that can be found in the well circulation system.

As the first step of this process, it is preferred to admix with the well fluid of a small effective amount an aliphatic alcohol, e.g., n-hexanol. The amount of the alcohol is usual not required above about 2% by volume. Usually good results are obtained using alcohol amounts above about 0.5% by volume. In most well fluids, the alcohol can be used in the amount of 0.5% by volume and larger amounts, such as 1.0% by volume, do not seem to appreciably increase the described solid removal results. Usually, the solids removal results decrease when the amount of the alcohol is decreased simultaneously below the 0.5% by volume level.

After the alcohol is thoroughly distributed in the well fluid, the next step of this process is to admix the surface active chemical aid, e.g. the surfactant bis hydroxy ethyl cetyl amine. The amount of the chemical aid is usually not required above about 2% by volume. Good results are obtained by using chemical aid amounts above about 0.5% by volume. In most well fluids, the chemical aid can be used in the amount of 0.5% by volume and larger amounts, such as 1.0% by volume, do not seem to appreciably increase the desired solid removal results. Usually, the solids removal results decrease when the amount of the chemical aid is decreased substantially below the 0.5% by volume level. Large amounts (e.g., above 3% by volume) of the chemical aid increases the amount of well fluid trapped in the removed solids. The chemical aid, and particularly the surfactant, appears to change the surface tension of the boundary film surrounding the negatively charged solid particles, and especially the bentonite constituents from drilling muds. This effect provided by the chemical aid is primarily the agglomeration of the solids mass from the well fluid.

It has been found that the minimum effective amounts of the alcohol and surface active chemical aid depends upon their activity nature and the particular solids in the well fluid. Thus, this minimum effective amount is emperical and there does not seem to be a determinable relationship in these amounts between a particular alcohol and a certain surface active chemical aid from the groups hereinafter defined.

After the alcohol and chemical aid are distributed within the well fluid, it is allowed to rest in the quiescent state. The solids are removed from the liquid phase by agglomeration into a gel-like soft mass which may float at the surface or settle to the container bottom depending upon the density of the agglomerated mass of solids. These solids remain stable in this agglomerated mass for substantial periods of time (e.g., a week) but can be redispersed if the well fluid is subject to remixing operations. The mass of solids are moved from the liquid phase by the sweeper or decanting or both in some instances where part of the solid mass floats, and another part of the mass sinks to the container bottom.

Generally, if the alcohol is added to the well fluid before the chemical aid, an immediate clearing of the liquid phase occurs upon termination of the mixing operations. Addition of the chemical aid before or with the alcohol, sometimes requires a long for quiescent condition for clearing solids from the liquid phase. The solids clearing time is measured in seconds and usually is completed within several minutes.

In either event, once the liquid phase has cleared, and the agglomerated mass of solids removed from it, the resultant well fluid is substantially solids-free, especially of particle sizes greater than 5 microns in maximum dimension.

EXAMPLE I

A salt type aqueous well fluid of a density of 14 pounds per barrel was treated in the laboratory by the present process into a solids-free condition. The well fluid at room temperature was contaminated with mud solids Then, n-hexanol and bis hydroxy ethyl cetyl amine (Aquiness MA401A) were added each in an amount of 0.5% by volume, with intensive mixing provided by a Despersator ® mixer for about 15-30 seconds. Immediately upon termination of mixing, the liquid phase cleared. The liquid phase was decanted from the agglomerated masses of mud solids. Filtration of the clean well fluid (e.g., liquid phase) showed that all of the remaining solids had particle sizes less than 5 microns in maximum dimension.

EXAMPLE II

The test of Example I was repeated but the surface active chemical aid was cocoamine. The resultant cleaned well fluid had particle sizes less than 5 microns in maximum dimension.

The solids-free well fluid from the present process may be introduced directly into the wellbore. However, rig operations usually require as a safety procedure the filtration of the salt-type aqueous well fluid in cartridge filters before its introduction into the wellbore. Because of the solids-free condition of the well fluid produced by the present process, there is substantially no solids loading of the filtering system on the drilling rig.

One advantage of the present process is in the small residual amount of alcohol and surface active chemical aid carried in the solids-free well fluid. If by accident, some solids are introduced into the well fluid, these solids agglomerate quickly and usually will be trapped in the filtering system on the rig rather than subsequently being introduced into the wellbore.

There are many embodiments of alcohol and the surface active chemical aid that can be used in this process, some of the embodiments will be obvious to the skilled chemist in surface chemistry, and other embodiments can be readily found by routine examination following the guidelines given in this description.

The aliphatic alcohol should have between 5 and 8 carbon atoms. Preferrably, the alcohol is n-hexanol but n-pentanol can also be used. Other aliphatic alcohols in the mentioned class can be used but do not provide as good results as the n-hexanol. For example, heptanol and octanol could be used if optimum results in solids removal from the salt based aqueous fluid were not desired.

The aliphatic alcohol does not have to be chemically pure but may contain impurities such as water or other alcohols, esters, ethers, etc., provided the impurity does not produce an unacceptible interference with the desired solids removal from the salt based aqueous fluids.

Although the preferred alcohol is n-hexanol, the other alcohols from the above-defined group can be used but it may be necessary to slightly vary process conditions for their usage. For example, pentanol work quickly in gathering together of the solids from the well fluid. However, the fluid must be filtered (or otherwise subjected to solids removal) within 24 hours. The solids separation become more difficult to achieve with time lapse. N-octanol and n-heptanol both produce solids removal but an increased dosage may be required along with more difficult solids removal under certain separating conditons (temperature, vibrations, etc).

The surface active chemical aid includes a surfactant, and usually includes a carrier solvent such as a small amount of an aromatic hdyrocarbon, corrosion and pitting inhibitor, and other additives desired to be added to the aqueous well fluid. The surfactant should have a molecular weight in the range of about 150 to about 500 with predominant hydrophobic characteristics. The surfactant is selected from the group comprising aliphatic amines, amides and aliphatic amine oxides wherein the amine and amide and amine oxide have an alkyl group with between 8 and 18 carbon atoms.

The surfactant can be bis hydroxy ethyl cetyl amine or cocoamine which produce good results in this process.

The bis hydroxy ethyl cetyl amine may be represented by the formula:

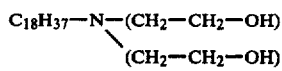

Cocoamine may be generally represented by the formula $CH_3(CH_2)_{10}CH_2—NH_2$ and it is prepared from monoethenoid fatty acids derived from coconuts. The "coco" group $C_{12}H_{25}$ is not a group containing a specific number of carbon atoms, but is a number of individual groups containing different numbers of carbon atoms. However, the $C_{12}H_{25}$ group is in greater amount than any other group.

The cocoamine may be a condensation product, i.e. oxalkylated cocoamine such as ethoxylated cocoamine with between 2 and 15 mols of ethylene oxide. More particularly, the condensation product is formed by subjecting cocoamine to a condensation with a plurality of mols of ethylene oxide in a manner well known in the art. In general, the condensation product of a mol of cocoamine with between 2 and 15 mols of ethylene oxide may be employed with good results. Preferably the condensation product is formed by condensing 10 mols of ethylene oxide per mol of cocoamine. Expressed on the basis of molecular weight, the ethoxylated cocoamine may have an average molecular weight between 285 and 860, but preferrably, has an average molecular weight of about 645.

Other oxyalkylated amines may be employed as the surfactant in this process and these surfactants are a well recognized class in the surface chemistry, where in this class many members are known for producing the desired surface active effect.

Other amines can be used in this process. For example, the alkanol amines which are available under the aquiness trademark can be used, such as aquiness MA401A. It is understood that this amine is principally bis hydroxy ethyl cetyl amine.

Other examples of amines usable in this invention are octylamine, dioctylamine, decylamine and dodecylamine.

In general, the surfactant can be selected from the group comprising aliphatic amines, amides and aliphatic amine oxides wherein the surface active amine and amide and amine oxides have an alkyl group with between 8 and 18 carbons, but preferably with between 10 and 14 carbon atoms. Good results can be obtained with surfactants that have a molecular weight of the surface active amine in the range of from about 150 to about 500, and with predominate hydrophobic characteristics.

Other usable surface active chemical aids presently in existence and to be developed in the future, can be readily selected from an inspection of the properties of the specifically mentioned members of the mentioned amine, amide and amine oxide surfactants. It is therefore, not only impossible to attempt a comprehensive catalog of such composition, but to attempt to describe the invention in its broader aspect in terms of specific chemcial names of these compounds would be too voluminous and unnecessary since one skilled in the art could, by following the description of the present invention, herein select a useful surface active chemical aid. This invention lies in the use of suitable surface active chemical aids in a process with the mentioned aliphatic alcohols to remove solids from the high density salt-type aqueous well fluids. The surface active chemical aids are important only in the sense that their properties can effect this function. To precisely define each specific useful chemical aid in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability or specific chemical aids suitable for this inventive process by applying them in the process set forth herein. In analogy to the case of a machine, wherein the use of certain materials of a construction or dimension of parts would lead to no practical useful result, various surface active compounds will be rejected and inapplicable where others would be operative. One can obviously assume that no one will wish to use a useless chemical aid nor will be misled because it is possible to apply the teachings of the present disclosure to do so. Thus, any surface active chemical aid that can perform the functions stated herein can be employed in the present process.

The operation theory of the alcohol and surface active chemical aid in the present process could not be determined within certaintly from information presently available. It is believed that the alcohol serves to destablize the dispersed solids by disrupting their electrophretic charges, and then the surfactant acts to gather the solids, and assembled oily materials, into a loose solids system that can be removed by careful liquid/solids phase separation techniques which do not impose shear or mixing energy during solids removal. For example, the liquid phase may be decanted from the solids. Alternatively, the solids can be removed gently by a sweeper such as used in air flotation cells.

It is preferred that the alcohol be added first and throughly admixed into the aqueous well fluid before the addition of the surface active chemical aid. However, with certain alcohol and surface active chemical aid combinations, these materials can be added together and good solids removed can be produced in this process. At this time, there is no known guideline to aid in selecting these materials for use together in the well fluid so as to produce the same level of good results as provided by the separate but successive addition of the alcohol and then the surface active chemical aid. Likewise, with certain ingredients, the surface active chemical aid can be admixed first with the well fluid, and then the alcohol is added with good solids removal by this process. At this time, there is no known guideline to aid in selecting which surface active chemical aid and alcohol will provide in this addition arrangement the desired good solids removal from well fluid. Unless the alcohol is first mixed into the well fluid and then followed by adding the surface active chemical aid, some experimentation will be required to determine which of these materials can be added together or in reverse order, and yet produce the desired good solids removal by the present process.

In general, the present process can be used to remove solids from all salt type of aqueous well fluids. Usually, the presence of corrosion inhibitors, antipitting compounds, etc. will not create any problems in solids removal. Some of the materials used in preparing drilling muds can interfere in the process, as by requiring increased amounts of alcohol, surface active chemical aid, or in extending separation of the solids from the liquid phase. These interfering materials can be removed before practicing the present process steps. For example, the well fluid may have an appreciable amount of polyelectrolytes or polymers such as cellulose based organic fluid loss agents (e.g., HEC). In these cases, the polymer can be removed by early treatment of the well fluid with a strong oxidant such as hydrogen peroxide before practicing the present process on the well fluid.

From the foregoing, it will be apparent that there has been herein described a process for removing solids from salt type aqueous well fluid which is especially effective. Various changes and alterations may be made in the practice of this process by those skilled in the art without departing from the spirit of the invention. It is intended that such changes be included within the scope of the appended claims. The present description is intended to be illustrative and not limitative of the present invention.

What is claimed is:

1. A process to produce a solids-free aqueous well fluid of high density type having one or more of the sodium, calcium or zinc salts with chloride and bromide, and mixtures thereof, the steps comprising:
   (a) introducing in small effective amounts an aliphatic alcohol with between 5 and 8 carbon atoms and a surface active chemical aid into the fluid; and
   (b) separating the agglomerated solids from the fluid before introduction into a wellbore in a solids free state, wherein the surface active chemical aid includes a surfactant having a molecular weight in the range of from about 150 to about 500 with predominant hydrophobic characteristics and the surfactant is selected from a group consisting of aliphatic amines, amides and aliphatic amine oxides with the amine and amide and amine oxides constituents having an alkyl group with between 8 and 18 carbon atoms.

2. The process of claim 1 wherein the alcohol is hexanol.

3. The process of claim 2 wherein the alcohol is added immediately prior to the addition of the chemical aid.

4. The process of claim 1 wherein the chemical aid is bis hydroxy ethyl cetyl amine.

5. The process of claim 4 wherein the alcohol is hexanol and the alcohol is added immediately prior to addition of the chemical aid.

6. The process of claim 2 wherein the chemical aid is cocamine.

7. The process of claim 5 wherein the chemical aid is cocamine.

8. The process of claim 2 wherein the amine has an alkyl group between 10 and 14 carbon atoms.

9. The process of claim 2 wherein the amine is condensed with between 2 and 15 mols of ethylene oxide.

10. The process of claim 2 wherein the amine has a fatty acid derived alkyl group.

11. A process to produce a solids-free aqueous well fluid of high density type having one or more of the sodium, calcium or zinc salts with chloride and bromide, and mixtures thereof, for introduction into a wellbore as a drilling, completion or packer fluid, the steps comprising:
   (a) introducing in small effective amounts an aliphatic alcohol with between 5 and 8 carbon atoms and a surface active chemical aid into the fluid; and
   (b) separating the agglomerated solids from the fluid before introduction into a wellbore in a solids free state, wherein the surface active chemical aid includes a surfactant having a molecular weight in the range of from about 150 to about 500 with predominant hydrophobic characteristics and the surfactant is selected from a group consisting of aliphatic amines, amides and aliphatic amine oxides with the amine and amide and amine oxides constituents having an alkyl group with between 8 and 18 carbon atoms.
   (c) the aliphatic alcohol and chemical aid being added to the fluid in any order and thoroughly intermixed into the fluid;
   (d) allowing the fluid with the aliphatic alcohol and chemical aid to stand quiescent and without agitation whereby the solids gather and accumulate in adhering masses;
   (e) separating the adhering mass of solids without agitation and the solids-free fluid, and
   (f) introducing the solids-free fluid into the wellbore as the drilling, completion or packer fluid.

* * * * *